Jan. 27, 1942.  B. LONG  2,271,373

METHOD OF TEMPERING GLASS

Original Filed Dec. 17, 1935

Inventor
Bernard Long
by Dorsey Cole & Gomer
Attorneys

Patented Jan. 27, 1942

2,271,373

UNITED STATES PATENT OFFICE 2,271,373

METHOD OF TEMPERING GLASS

Bernard Long, Paris, France, assignor to The American Securit Company, Wilmington, Del., a company of Delaware Original application December 17, 1935, Serial No. 54,918, now Patent No. 2,244,715, dated June 10, 1941. Divided and this application March 17, 1939, Serial No. 262,579. In France December 22, 1934

2 Claims. (Cl. 49—89)

For some purposes it is desirable that a piece of glass instead of being tempered throughout its area to a substantially equal amount, be tempered unequally at different points, or, while tempered at one point or zone, be without strain at another. An example of this is the windshield sheet shown and claimed in my prior application, Serial No. 54,918, filed December 17, 1935, which application issued into Patent No. 2,244,715, on June 10, 1941, of which application this is a division, and which sheet consists of a plurality of more or less circular untempered portions connected by areas of high temper. The aforesaid application describes several methods of producing such a windshield and this application is directed to one of such methods which is characterized by the initial tempering of areas which are to be ultimately non-tempered, and removing the strain from such selected areas by a proper heat treatment.

Referring to the accompanying drawing in which corresponding parts are designated by corresponding marks of reference:

Figure 1:
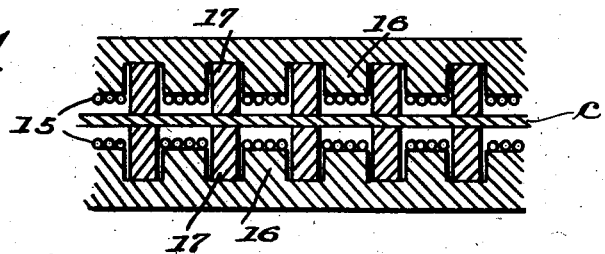
Figure 1 is a sectional view of a reheating structure adapted to carry out my improved method on a sheet of glass.
Figure 2:
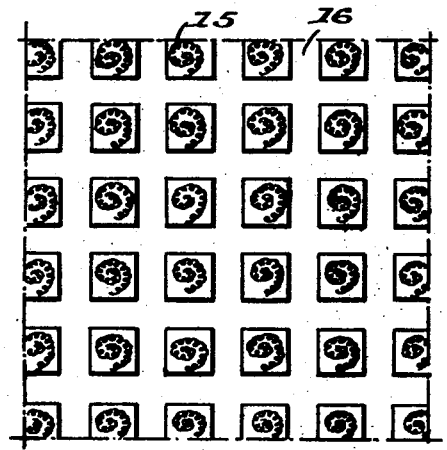
Figure 2 is an elevation of one of the refractory slabs shown in Figure 1.
Figure 3:
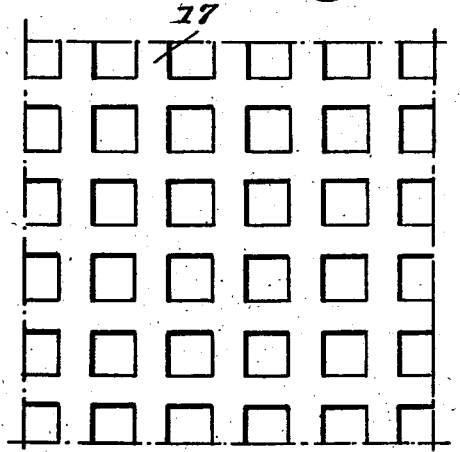
Figure 3 is an elevation of one of the grills shown in Figure 1.

In carrying out my method as applied to a windshield, a sheet of glass c after having been tempered in any suitable known way, more or less uniformly, is placed between reheaters. Each of these consists of a refractory slab 16 having mounted on the inner face thereof at points opposite those portions of the plate from which the temper is to be removed, heating elements 15, preferably in the form of electrically heated resistance coils. Between the heating elements are located the vertical and horizontal bars of a grill work 17 which may be hollow for the passage of the cooling fluid. The bars project from the inner face of the slab and contact with the plate. Under these conditions heat from the elements 15 releases the strain in the tempered sheets in those areas thereof which are subjected to the heat, these areas being limited by the bars of the grill.

Having thus described my invention, what I claim and desire to secure by Letters Patent is:

1. The hereinbefore described method of producing a glass article having portions thereof more highly tempered than other portions, which comprises tempering such article and then removing strain from a selected zone thereof by the localized application of heat to such zone.

2. A method of manufacturing a sheet of glass having in at least a portion thereof tempered zones surrounding zones which are tempered to a lesser degree which comprises tempering said portion of the sheet by heating and cooling suddenly, and subsequently reheating said portion of the sheet at the surrounded zones.

BERNARD LONG.